(12) United States Patent
Lee et al.

(10) Patent No.: US 11,789,141 B2
(45) Date of Patent: Oct. 17, 2023

(54) OMNIDIRECTIONAL SENSOR FUSION SYSTEM AND METHOD AND VEHICLE INCLUDING THE SAME

(71) Applicants: HYUNDAI MOTOR COMPANY, Seoul (KR); KIA Motors Corporation, Seoul (KR)

(72) Inventors: Hoon Lee, Gunpo-si (KR); Sang Bok Won, Seoul (KR); Hyung Sun Jang, Anyang-si (KR); Bo Young Yun, Hwaseong-si (KR); Seul Ki Han, Seoul (KR); Ji Eun Won, Hwaseong-si (KR); Uk Il Yang, Yongin-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 540 days.

(21) Appl. No.: 16/513,300

(22) Filed: Jul. 16, 2019

(65) Prior Publication Data
US 2020/0174113 A1 Jun. 4, 2020

(30) Foreign Application Priority Data
Dec. 4, 2018 (KR) .......... 10-2018-0154449

(51) Int. Cl.
*G01S 13/86* (2006.01)
*G01S 13/931* (2020.01)
*B60R 11/04* (2006.01)

(52) U.S. Cl.
CPC ............ *G01S 13/867* (2013.01); *B60R 11/04* (2013.01); *G01S 13/931* (2013.01); *B60R 2300/301* (2013.01); *G01S 2013/9327* (2020.01)

(58) Field of Classification Search
CPC .......... G01S 13/66–13/72; G01S 13/93; G01S 13/867; G01S 13/931; G01S 2013/93271;
(Continued)

(56) References Cited

U.S. PATENT DOCUMENTS 7,719,461 B1 * 5/2010 Mookerjee .............. G01S 7/003
  342/135
10,457,283 B2 * 10/2019 Tamura ................ G05D 1/0212
(Continued)

FOREIGN PATENT DOCUMENTS

KR 20160013736 A 2/2016
KR 20170020666 A 2/2017

OTHER PUBLICATIONS

Office Action cited in corresponding Korean patent application No. KR10-2018-0154449; dated Oct. 20, 2022; 14 pp.

*Primary Examiner* — Olumide Ajibade Akonai
(74) *Attorney, Agent, or Firm* — LEMPIA SUMMERFIELD KATZ LLC

(57) ABSTRACT

The present disclosure relates to an omnidirectional sensor fusion system and method and a vehicle including the same. The omnidirectional sensor fusion system includes a sensor track processing unit configured to receive recognition information from one or more sensors to generate a sensor track, a sensor track association determination unit configured to determine, based on the generated sensor track being located at an overlapping point of sensing regions of the one or more sensors, an association between a previous sensor fusion track and the sensor track, the sensor track association determination unit further configured to change sensor track information in response to the determined association and output a sensor fusion track, a sensor fusion track tracing unit configured to trace the output sensor fusion track, and
(Continued)

a sensor fusion track maintenance unit configured to maintain the traced sensor fusion track.

20 Claims, 12 Drawing Sheets

(58) Field of Classification Search
CPC .............. G01S 17/931; G01S 13/865; G01S 2013/932; G01S 17/89; G01S 13/87; G01S 13/89; G01S 17/93; G01S 2013/93185; G01S 2013/93274; G01S 2015/938; G01S 13/04; G01S 13/723; G01S 13/726; G01S 2013/93272; G01S 2013/9327; B60R 11/04; B60R 2300/301; B60R 1/00; G06V 20/56; G06V 10/80; G06V 20/58; G06V 10/757; G06V 10/751; G06V 20/588; B60W 2556/35; B60W 2420/52; B60W 2420/42; B60W 30/06; B60W 30/0953; B60W 10/20; B60W 10/18; B60W 50/0097; B60W 30/12; B60W 2050/0022; B60W 40/02; B60W 30/08; G08G 1/16; G08G 1/166; H04N 7/18; G05D 1/021; G05D 1/0231; G05D 1/0257

See application file for complete search history.

(56) References Cited

U.S. PATENT DOCUMENTS

| | | | |
|---|---|---|---|
| 11,067,993 B2* | 7/2021 | Gali | B60W 10/20 |
| 2002/0067287 A1* | 6/2002 | Delcheccolo | H01Q 21/0075 |
| | | | 340/901 |
| 2005/0021201 A1* | 1/2005 | Klotz | B60W 30/16 |
| | | | 702/189 |
| 2012/0083974 A1* | 4/2012 | Sandblom | A61B 5/163 |
| | | | 702/19 |
| 2017/0225617 A1* | 8/2017 | Morimura | G06V 40/10 |
| 2017/0276788 A1* | 9/2017 | Wodrich | G01S 13/878 |
| 2018/0268227 A1* | 9/2018 | Nakada | H04N 5/772 |

* cited by examiner

OMNIDIRECTIONAL SENSOR FUSION SYSTEM AND METHOD AND VEHICLE INCLUDING THE SAME

This application claims the benefit of Korean Patent Application No. 10-2018-0154449, filed on Dec. 4, 2018, which is hereby incorporated by reference as if fully set forth herein.

BACKGROUND

Field

The present disclosure relates to an omnidirectional sensor fusion system and method, and more particularly to an omnidirectional sensor fusion system and method, which is capable of increasing reliability of omnidirectional sensor fusion with respect to a boundary region, and a vehicle including the same.

Discussion of the Related Art

In general, recently developed vehicles are intelligent vehicles that have improved fuel efficiency and performance as transportation means and that are capable of providing further improved safety and convenience using well-developed information and communication technology.

However, because intelligent vehicles are equipped with various devices performing additional functions, such as an entertainment system, an air purification device and various conveniences, a driver frequently operates these additional devices as well as devices for driving, which leads to careless driving and an increase in vehicle accidents.

Therefore, in recent years, studies on safety systems for preventing or avoiding vehicle collisions have been actively conducted.

SUMMARY

Accordingly, the present disclosure is directed to an omnidirectional sensor fusion system and method and a vehicle including the same that substantially obviate one or more problems due to limitations and disadvantages of the related art.

Aspects of the present disclosure provide an omnidirectional sensor fusion system and method, which generate a sensor fusion track based on the association between sensor tracks located at an overlapping point of the sensing regions of sensors, thereby increasing reliability of omnidirectional sensor fusion with respect to a boundary region and performing a robust sensor fusion logic, and to provide a vehicle including the same.

Additional advantages and features of the present disclosure will be set forth in part in the description which follows and in part will become apparent to those having ordinary skill in the art upon examination of the following or may be learned from practice of the present disclosure. The advantages of the present disclosure may be realized and attained by the structure particularly pointed out in the written description according to one or more embodiments of the present disclosure and the claims hereof as well as the appended drawings.

In accordance with an aspect of the present disclosure, there is provided an omnidirectional sensor fusion system including a sensor track processing unit configured to receive multiple pieces of recognition information from sensors to generate a sensor track, a sensor track association determination unit configured to determine, when the generated sensor track is located at an overlapping point of sensing regions of sensors, association between a sensor fusion track at a previous time point and the sensor track at a current time point, the sensor track association determination unit changing sensor track information in response to the determined association and outputting a sensor fusion track, a sensor fusion track tracing unit configured to trace the output sensor fusion track, and a sensor fusion track maintenance unit configured to maintain the traced sensor fusion track.

In accordance with another aspect of the present disclosure, there is provided an omnidirectional sensor fusion method including receiving multiple pieces of recognition information from sensors, generating a sensor track based on the multiple pieces of recognition information, determining or confirming whether the generated sensor track is located at an overlapping point of sensing regions of sensors, upon determining or confirming that the sensor track is located at the overlapping point of the sensing regions of the sensors, determining association between a sensor fusion track at a previous time point and a sensor track at a current time point, changing sensor track information in response to the determined association to output a sensor fusion track, and tracing and maintaining the output sensor fusion track.

In accordance with a further aspect of the present disclosure, there is provided a computer-readable recording medium, in which a program for implementing the omnidirectional sensor fusion method of the omnidirectional sensor fusion system according to an embodiment of the present disclosure is recorded, the computer-readable recording medium performing the process provided by the omnidirectional sensor fusion method.

In accordance with a still further aspect of the present disclosure, there is provided a vehicle including a sensing device configured to sense a nearby vehicle, and an omnidirectional sensor fusion system configured to output a sensor fusion track based on multiple pieces of recognition information received from the sensing device, the omnidirectional sensor fusion system including a sensor track processing unit configured to receive the multiple pieces of recognition information to generate a sensor track, a sensor track association determination unit configured to determine, when the generated sensor track is located at an overlapping point of sensing regions of sensors, association between a sensor fusion track at a previous time point and the sensor track at a current time point, the sensor track association determination unit changing sensor track information in response to the determined association and outputting a sensor fusion track, a sensor fusion track tracing unit configured to trace the output sensor fusion track, and a sensor fusion track maintenance unit configured to maintain the traced sensor fusion track.

It is to be understood that both the foregoing general description and the following detailed description of the present disclosure are exemplary and explanatory and are intended to provide further explanation of the present disclosure.

BRIEF DESCRIPTION OF THE DRAWINGS

The accompanying drawings, which are included to provide a further understanding of the present disclosure and are incorporated in and constitute a part of this application, illustrate embodiment(s) of the present disclosure and together with the description serve to explain the principle of the present disclosure. In the drawings.

DETAILED DESCRIPTION

Figure 1:
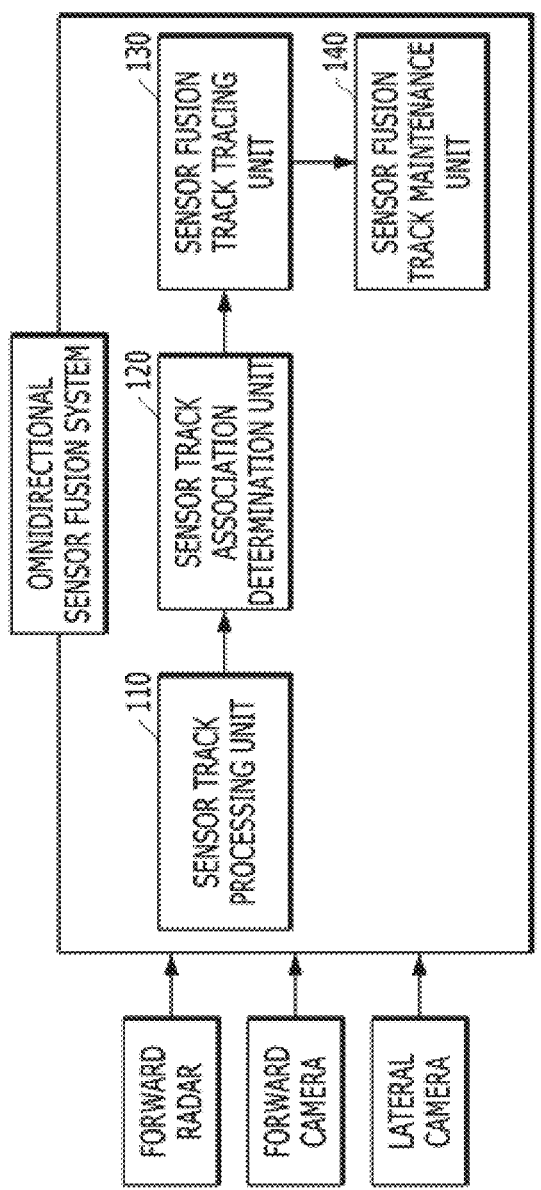
FIG. 1 is a block diagram showing an omnidirectional sensor fusion system according to an embodiment of the present disclosure.

Hereinafter, embodiments of the present disclosure will be described in detail with reference to the accompanying drawings so as for those skilled in the art to easily carry out the embodiments. The present disclosure may, however, be embodied in many different forms, and should not be construed as being limited to the embodiments set forth herein. In the drawings, parts irrelevant to description of the present disclosure will be omitted for clarity. Like reference numerals refer to like elements throughout the specification.

Throughout the specification, unless explicitly described to the contrary, the word "include" and variations such as "includes" or "including" will be understood to imply the inclusion of stated elements but not the exclusion of any other elements. In addition, the terms "-er", "-or" and "module" used in the specification mean units for processing at least one function and operation and can be implemented by hardware components or software components and combinations thereof.

Throughout the specification, unless explicitly described to the contrary, the word "include" and variations such as "includes" or "including" will be understood to imply the inclusion of stated elements but not the exclusion of any other elements. In addition, the same reference numerals used throughout the specification refer to the same constituent elements.

Vehicle collision prevention systems may include an adaptive cruise control system, a forward vehicle collision warning system, a lane departure warning system, and the like. These vehicle collision prevention systems are mainly used for high speed driving to prevent major accidents, and primarily use technology of sensing obstacles a long distance from the vehicle in a high-speed driving state.

In order to accurately recognize a nearby vehicle, the vehicle collision prevention system generates a sensor fusion track by associating multiple pieces of sensing information received from sensing devices such as a camera, radar, and the like.

According to a conventional sensor fusion method, values recognized by sensors such as forward radar, a forward camera and lateral radar are used irrespective of the overlapping sensing regions between these sensors, incurring errors in the lateral and longitudinal positions and in the speed in the process of performing sensor fusion.

In particular, in the process of performing sensor fusion, a value obtained by tracing an object within a sensing region in which fields of view (FOVs) overlap may need to be outputted so as to indicate a single ID, a position and a speed of the object without a sudden variation.

However, if sensor fusion is performed using multiple pieces of information irrespective of a sensing region in which FOVs overlap, this incurs large errors in the fusion track output position and the speed, which may adversely affect the operation of an advanced driver assistance system (ADAS).

For example, when a vehicle traveling in an adjacent lane overtakes the host vehicle and reaches the distal end region of the FOV of the forward radar, if sensor fusion is performed, large errors in the longitudinal and lateral positions may occur, and a smart cruise control (SCC) system may erroneously decelerate the host vehicle due to the vehicle that overtook the host vehicle.

This is because the forward radar recognizes the lateral side of an object and the lateral radar recognizes the center of the rear side of an object.

Therefore, there is a demand for the development of an omnidirectional sensor fusion system that is capable of increasing reliability of omnidirectional sensor fusion with respect to a boundary region and performing a robust sensor fusion logic.

Hereinafter, an omnidirectional sensor fusion system and method and a vehicle including the same according to the embodiments of the present disclosure will be described in detail with reference to FIGS. 1 to 12.

FIG. 1 is a block diagram showing an omnidirectional sensor fusion system according to an embodiment of the present disclosure.

As shown in FIG. 1, the omnidirectional sensor fusion system according to the present disclosure may include a sensor track processing unit 110, a sensor track association determination unit 120, a sensor fusion track tracing unit 130, and a sensor fusion track maintenance unit 140.

The sensor track processing unit 110 may receive multiple pieces of information recognized by sensors and may generate a sensor track.

Here, when receiving multiple pieces of information recognized by sensors, the sensor track processing unit 110 may receive information recognized by a forward camera.

When the generated sensor track is located at a point where the sensing regions of the sensors overlap, the sensor track association determination unit 120 may determine the association between the sensor fusion track at a previous time point and the sensor track at a current time point, may change the sensor track information in response to the determined association, and may output a sensor fusion track.

According to a first embodiment, when changing the sensor track information, if the association is such that the sensor track moves from the sensing region of the lateral radar to an overlapping point between the sensing region of the lateral radar and the sensing region of the forward radar, the sensor track association determination unit 120 may change the sensor track information.

Here, when changing the sensor track information, the sensor track association determination unit 120 may change the sensor track information by offsetting the lateral position information of the forward radar track based on the width information of the lateral radar track and fusing the offset lateral position information of the forward radar track and the longitudinal position information of the lateral radar track.

For example, the offset lateral position information of the forward radar track may be the same as the lateral position information of the lateral radar track.

The width information of the lateral radar track may range from about 1 m to about 3 m, without limitation thereto.

When changing the sensor track information, the sensor track association determination unit 120 may determine or confirm whether the change rate of the sensor track information is equal to or less than a reference value. If the change rate of the sensor track information is equal to or less than a reference value, the sensor track association determination unit 120 may change the sensor track information.

Here, the change rate of the sensor track information may include at least one of a position change rate, a speed change rate or an acceleration change rate of the sensor track information, without limitation thereto.

According to a second embodiment, when changing the sensor track information, if the association is such that the sensor track moves from the first lateral radar sensing region to the second lateral radar sensing region in the lateral direction, the sensor track association determination unit 120 may generate sensor track information located at a dead-zone point between the first lateral radar sensing region and the second lateral radar sensing region.

Here, the sensor track association determination unit 120 may generate sensor track information based on pre-stored memory track information.

In some cases, in the second embodiment, when changing the sensor track information, if the association is such that the sensor track moves from the first lateral radar sensing region to the second lateral radar sensing region in the lateral direction, the sensor track association determination unit 120 may change sensor track information located at an overlapping point between the first lateral radar sensing region and the second lateral radar sensing region.

Here, the sensor track association determination unit 120 may change the sensor track information based on the first lateral radar track information.

According to a third embodiment, when changing the sensor track information, if the association is such that the sensor track moves from the sensing region of the lateral radar to an overlapping point between the sensing region of the lateral radar and the sensing region of the forward camera, the sensor track association determination unit 120 may change the sensor track information located at the overlapping point.

Here, when changing the sensor track information, the sensor track association determination unit 120 may assign a weighted value to each of the lateral position information of the forward camera track and the longitudinal position information of the lateral radar track, and may change the sensor track information by fusing the lateral position information of the forward camera track and the longitudinal position information of the lateral radar track, to each of which the weighted value is assigned.

For example, when changing the sensor track information, the sensor track association determination unit 120 may calculate a difference value between the lateral position information of the forward radar track and the lateral position information of the lateral camera track, and may determine or confirm whether the calculated difference value is equal to or less than a reference value. If the calculated difference value is equal to or less than a reference value, the sensor track association determination unit 120 may change the sensor track information by assigning a weighted value to each of the lateral position information of the forward camera track and the longitudinal position information of the lateral radar track.

Here, the sensor track association determination unit 120 may determine or confirm whether the calculated difference value is equal to or less than a reference value using the following equation: $d < a\,(V_x \times 0.05)$ (where d represents a difference value, a represents a tuning parameter, $V_x$ represents a lateral speed of the lateral radar track, and 0.05 represents 0.05 s, which is equal to 50 ms).

According to a fourth embodiment, when changing the sensor track information, if the association is such that the sensor track moves from a first overlapping point between the sensing region of the lateral radar and the sensing region of the forward camera to a second overlapping point among the sensing region of the lateral radar, the sensing region of the forward camera and the sensing region of the forward radar, the sensor track association determination unit 120 may change the sensor track information.

Here, when changing the sensor track information, the sensor track association determination unit 120 may assign a weighted value to the longitudinal position information of the forward radar track, and may change the sensor track information by fusing the longitudinal position information of the forward radar track, to which the weighted value is assigned, the longitudinal position information of the forward camera track and the longitudinal position information of the lateral radar track.

According to a fifth embodiment, when changing the sensor track information, if the association is such that the sensor track moves from a first overlapping point between the sensing region of the lateral radar and the sensing region of the forward radar to a second overlapping point among the sensing region of the lateral radar, the sensing region of the forward radar and the sensing region of the forward camera, the sensor track association determination unit 120 may change the sensor track information.

Here, when changing the sensor track information, the sensor track association determination unit 120 may assign a weighted value to the lateral position information of the forward camera track, and may change the sensor track information by fusing the longitudinal position information of the forward camera track, to which the weighted value is assigned, the longitudinal position information of the forward radar track and the longitudinal position information of the lateral radar track.

According to a sixth embodiment, when changing the sensor track information, if the association is such that the sensor track moves from the sensing region of the forward radar to an overlapping point between the sensing region of the forward radar and the sensing region of the forward camera, the sensor track association determination unit 120 may change the sensor track information.

Here, when changing the sensor track information, the sensor track association determination unit 120 may assign a weighted value to each of the lateral position information of the forward camera track and the longitudinal position information of the forward radar track, and may change the sensor track information by fusing the lateral position information of the forward camera track and the longitudinal position information of the forward radar track, to each of which the weighted value is assigned.

According to a seventh embodiment, when changing the sensor track information, if the association is such that the sensor track moves from the sensing region of the forward radar to an overlapping point between the sensing region of the forward radar and the sensing region of the lateral radar, the sensor track association determination unit 120 may change the sensor track information.

Here, when changing the sensor track information, the sensor track association determination unit 120 may assign a weighted value to the longitudinal position information of the forward radar track, and may change the sensor track information by fusing the longitudinal position information of the forward radar track, to which the weighted value is assigned, and the longitudinal position information of the lateral radar track.

According to an eighth embodiment, when changing the sensor track information, if the association is such that the sensor track moves from a first overlapping point between the sensing region of the forward radar and the sensing region of the forward camera to a second overlapping point among the sensing region of the forward radar, the sensing region of the forward camera and the sensing region of the lateral radar, the sensor track association determination unit 120 may change the sensor track information.

Here, when changing the sensor track information, the sensor track association determination unit 120 may assign a weighted value to the longitudinal position information of the forward radar track, and may change the sensor track information by fusing the longitudinal position information of the forward radar track, to which the weighted value is assigned, the longitudinal position information of the forward camera track and the longitudinal position information of the lateral radar track.

According to a ninth embodiment, when changing the sensor track information, if the association is such that the sensor track moves from a first overlapping point between the sensing region of the forward radar and the sensing region of the lateral radar to a second overlapping point among the sensing region of the forward radar, the sensing region of the lateral radar and the sensing region of the forward camera, the sensor track association determination unit 120 may change the sensor track information.

Here, when changing the sensor track information, the sensor track association determination unit 120 may assign a weighted value to each of the lateral position information of the forward camera track and the longitudinal position information of the forward radar track, and may change the sensor track information by fusing the lateral position information of the forward camera track and the longitudinal position information of the forward radar track, to each of which the weighted value is assigned.

According to a tenth embodiment, when changing the sensor track information, if the association is such that the sensor track is located at an overlapping point between the first lateral radar sensing region and the second lateral radar sensing region in the rear region, the sensor track association determination unit 120 may change the sensor track information.

Here, when changing the sensor track information, the sensor track association determination unit 120 may change the sensor track information by selecting any one of the first lateral radar track information and the second lateral radar track information.

Depending on the embodiment, when changing the sensor track information, the sensor track association determination unit 120 may change the sensor track information by fusing the first lateral radar track information and the second lateral radar track information in a ratio of 1:1.

Alternatively, when changing the sensor track information, the sensor track association determination unit 120 may change the sensor track information by selecting one of the first lateral radar track information and the second lateral radar track information, which is adjacent to the lateral radar.

Next, the sensor fusion track tracing unit 130 may trace the sensor fusion track output from the sensor track association determination unit 120, and the sensor fusion track maintenance unit 140 may maintain the traced sensor fusion track.

As such, the system may generate a sensor fusion track based on the association of a sensor track located at an overlapping point of the sensing regions of the sensors, thereby increasing reliability of the omnidirectional sensor fusion with respect to the boundary region and realizing a robust sensor fusion logic.

For example, the system may be capable of increasing recognition reliability and improving the robustness of the sensor fusion by strategically using the fusion method in the sensing region in which fields of view (FOVs) overlap in the process of performing the omnidirectional sensor fusion.

Further, the system may have an algorithm so as to avoid sudden variations in position, speed and acceleration information of a vehicle recognized in a recognition boundary region (a sensor overlapping region or an independent sensor region) due to the installation of sensors.

Still further, the system may generate a single sensor fusion track with respect to a single target object, and may perform omnidirectional sensor fusion so that a single ID is generated.

FIGS. 2 to 11 are views showing an omnidirectional sensor fusion method according to embodiments of the present disclosure.

When the generated sensor track is located at an overlapping point between the sensing regions of the sensors, the system may determine the association between the sensor fusion track at a previous time point and the sensor track at a current time point, may change the sensor track information in response to the determined association, and may output a sensor fusion track.

For example, the system may determine the association between the sensor fusion track at a previous time point and the measured track that is newly received using the omnidirectional sensor fusion algorithm, and may change the association map. For example, the system may generate a new association map using an unassociated measured track.

Figure 2:
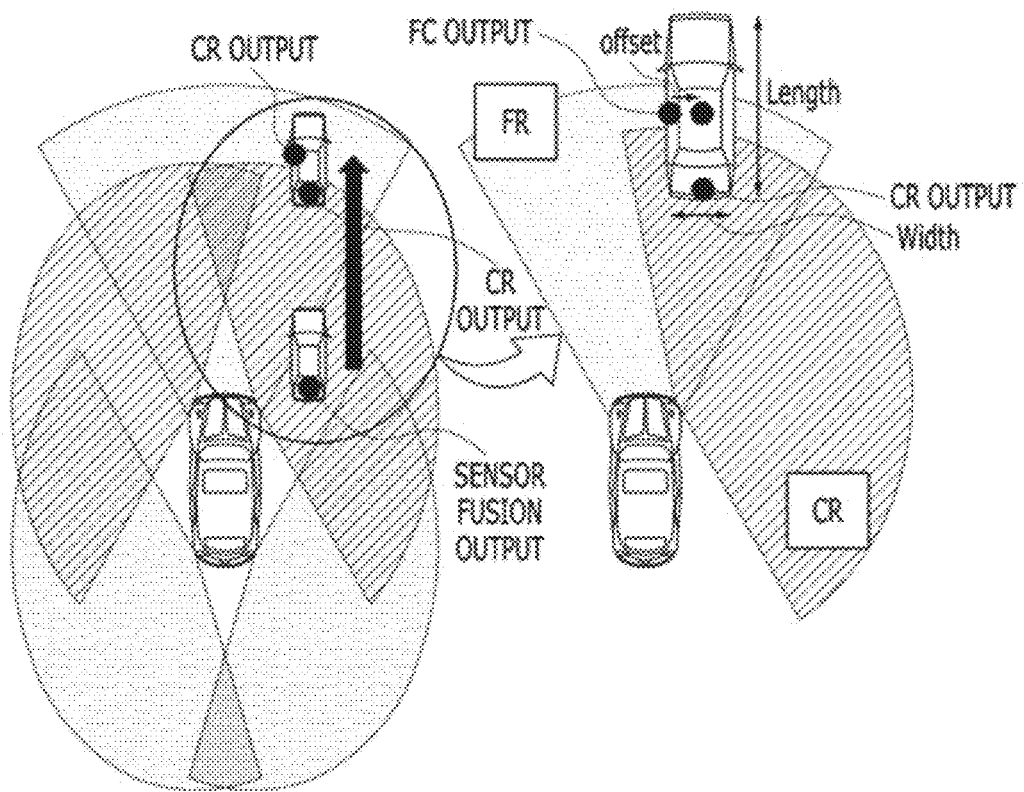
FIGS. 2 to 11 are views showing an omnidirectional sensor fusion method according to embodiments of the present disclosure.

As shown in FIG. 2, if the association is such that the sensor track moves from the sensing region of the lateral radar CR to an overlapping point between the sensing region of the lateral radar CR and the sensing region of the forward radar FR, the omnidirectional sensor fusion method according to the first embodiment may change the sensor track information.

Here, when changing the sensor track information, the system may change the sensor track information by offsetting the lateral position information of the forward radar track based on the width information of the lateral radar track and fusing the offset lateral position information of the forward radar track and the longitudinal position information of the lateral radar track.

For example, the offset lateral position information of the forward radar track may be the same as the lateral position information of the lateral radar track.

The width information of the lateral radar track may range from about 1 m to about 3 m, without limitation thereto.

When changing the sensor track information, the sensor track association determination unit 120 may determine or confirm whether the change rate of the sensor track information is equal to or less than a reference value. If the change rate of the sensor track information is equal to or less than a reference value, the sensor track association determination unit 120 may change the sensor track information.

Here, the change rate of the sensor track information may include at least one of a position change rate, a speed change rate or an acceleration change rate of the sensor track information, without limitation thereto.

For example, in the first embodiment, if CR→CR+FR, when a vehicle traveling in an adjacent lane overtakes the host vehicle and reaches the distal end region of the field of view (FOV) of the forward radar FR, errors in the longitudinal and lateral positions may occur in the process of performing sensor fusion.

This is because the forward radar FR recognizes the lateral side of an object and the lateral radar CR recognizes the center of the rear side of an object.

Thus, when the FR track is generated, the width information of the CR track is utilized to offset the lateral position without trusting the longitudinal direction position information, and the longitudinal direction position information of the lateral radar may be used.

At this time, sudden variations in position, speed and acceleration information of a vehicle recognized in a sensor overlapping region or an independent sensor region may need to be avoided.

Figure 3:
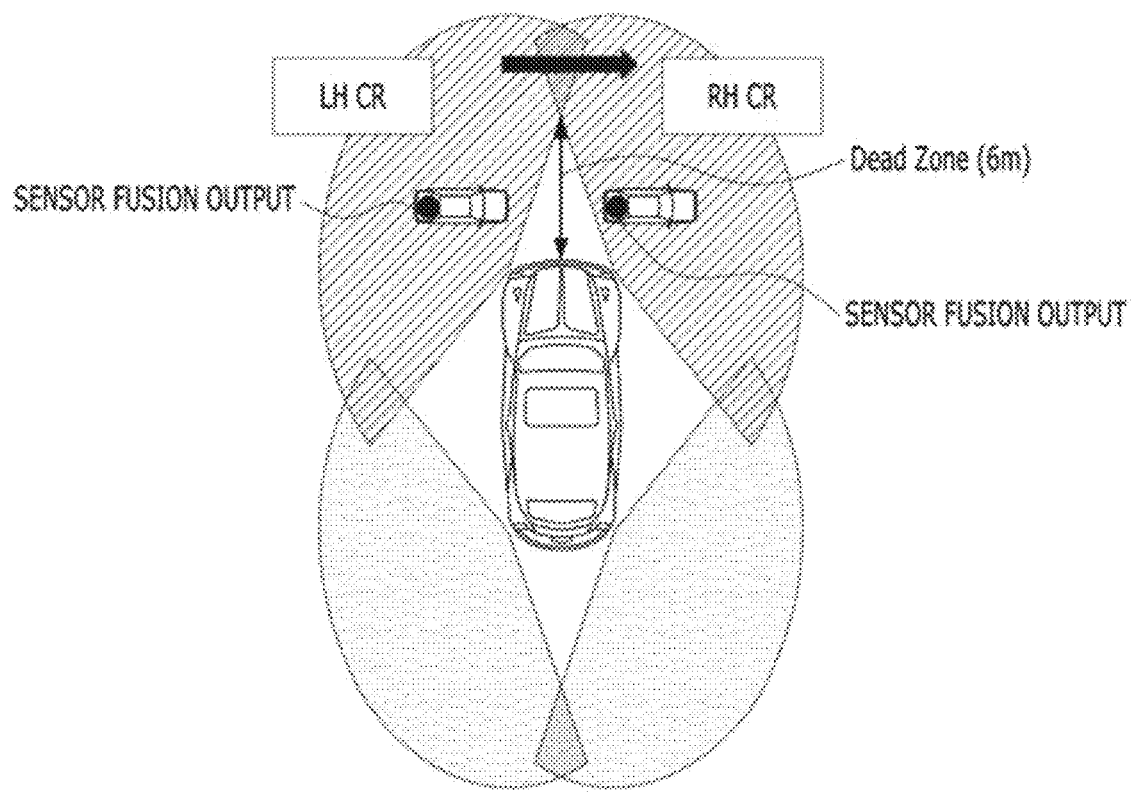

As shown in FIG. 3, if the association is such that the sensor track moves from the first lateral radar CR sensing region to the second lateral radar CR sensing region in the lateral direction, the omnidirectional sensor fusion method according to the second embodiment may generate sensor track information located at a dead-zone point between the first lateral radar sensing region and the second lateral radar sensing region.

Here, the system according to embodiments of the present disclosure may generate sensor track information based on pre-stored memory track information.

In some cases, in the second embodiment, if the association is such that the sensor track moves from the first lateral radar sensing region to the second lateral radar sensing region in the lateral direction, the system may change the sensor track information located at an overlapping point between the first lateral radar sensing region and the second lateral radar sensing region.

Here, the system may change the sensor track information based on the first lateral radar track information.

For example, in the second embodiment, if LH CR→RH CR, a dead zone, in which an object moving in the lateral direction is not recognized by the lateral radar CR, may be present at a distance of about 6 m ahead of the host vehicle.

At this time, because the relative lateral position is close to 0, there may occur a case in which a lateral radar track is not present.

Therefore, in order to solve this, the system may cope with the situation using the memory track and may use an existing lateral radar track because the exiting lateral radar track is more reliable at an intersecting portion.

Here, memory tracking at a Kalman filter is referred to as coasting. When a measured value is not present, time update is performed based on the system model without updating the measured value.

Figure 4:
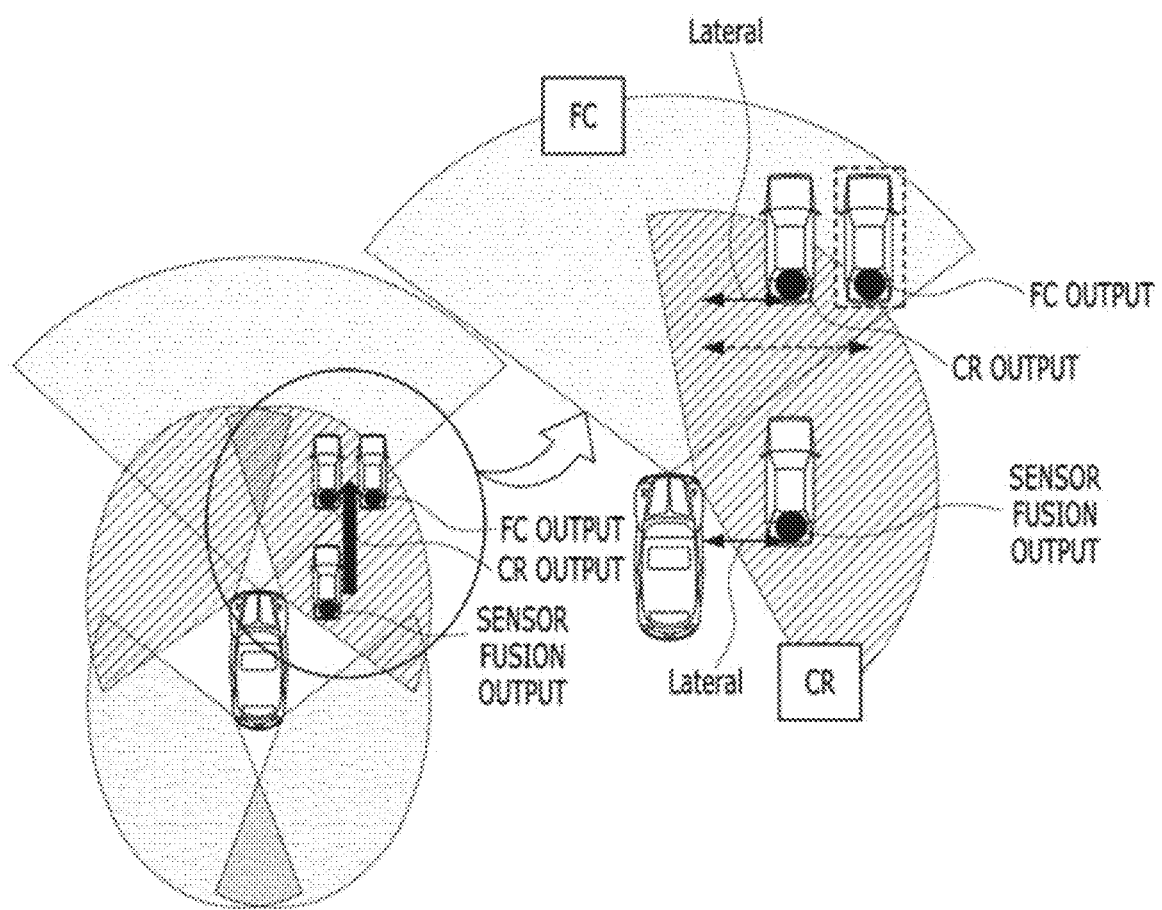

As shown in FIG. 4, if the association is such that the sensor track moves from the sensing region of the lateral radar CR to an overlapping point between the sensing region of the lateral radar CR and the sensing region of the forward camera FC, the omnidirectional sensor fusion method according to the third embodiment may change the sensor track information located at the overlapping point.

Here, the system may assign a weighted value to each of the lateral position information of the forward camera track and the longitudinal position information of the lateral radar track, and may change the sensor track information by fusing the lateral position information of the forward camera track and the longitudinal position information of the lateral radar track, to each of which the weighted value is assigned.

For example, the system may calculate a difference value between the lateral position information of the forward radar track and the lateral position information of the lateral camera track, and may determine or confirm whether the calculated difference value is equal to or less than a reference value. If the calculated difference value is equal to or less than a reference value, the system may change the sensor track information by assigning a weighted value to each of the lateral position information of the forward camera track and the longitudinal position information of the lateral radar track.

Here, the system may determine or confirm whether the calculated difference value is equal to or less than a reference value using the following equation: $d<a (Vx \times 0.05)$ (where d represents a difference value, a represents a tuning parameter, Vx represents a lateral speed of the lateral radar track, and 0.05 represents 0.05 s, which is equal to 50 ms).

For example, in the third embodiment, if CR→CR+FC, the lateral position may not be accurate at a boundary region.

Therefore, since the lateral accuracy of the forward camera is higher than that of the lateral radar, the system may perform sensor fusion by assigning weighted values to the lateral position FC and to the longitudinal position CR.

However, as shown in FIG. 4, if the difference in lateral position between the lateral radar and the forward camera is large, it is necessary to adjust the lateral position to be changed within an available lateral moving range in consideration of a relative speed.

Figure 5:
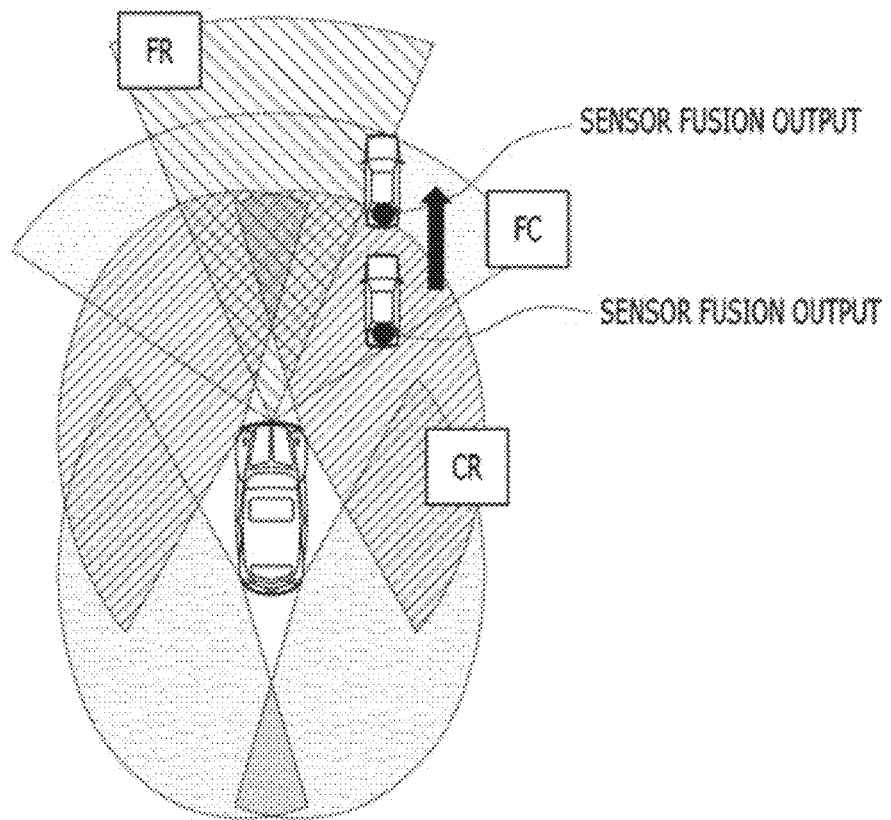

As shown in FIG. 5, if the association is such that the sensor track moves from a first overlapping point between the sensing region of the lateral radar CR and the sensing region of the forward camera FC to a second overlapping point among the sensing region of the lateral radar CR, the sensing region of the forward camera FC and the sensing region of the forward radar FR, the omnidirectional sensor fusion method according to the fourth embodiment may change the sensor track information.

Here, when changing the sensor track information, the system may assign a weighted value to the longitudinal position information of the forward radar track, and may change the sensor track information by fusing the longitudinal position information of the forward radar track, to which the weighted value is assigned, the longitudinal position information of the forward camera track and the longitudinal position information of the lateral radar track.

For example, in the fourth embodiment, if CR+FC→CR+FC+FR, the difference in longitudinal direction position, speed and performance between the lateral radar and the forward radar may not be large. In this case, it is expected that there is no large change in the estimation performance.

However, when an object enters the FR region, the FR longitudinal direction position is more reliable than the CR longitudinal direction position, and is therefore utilized for sensor fusion by assigning a weighted value to the longitudinal direction information of the forward radar.

Figure 6:
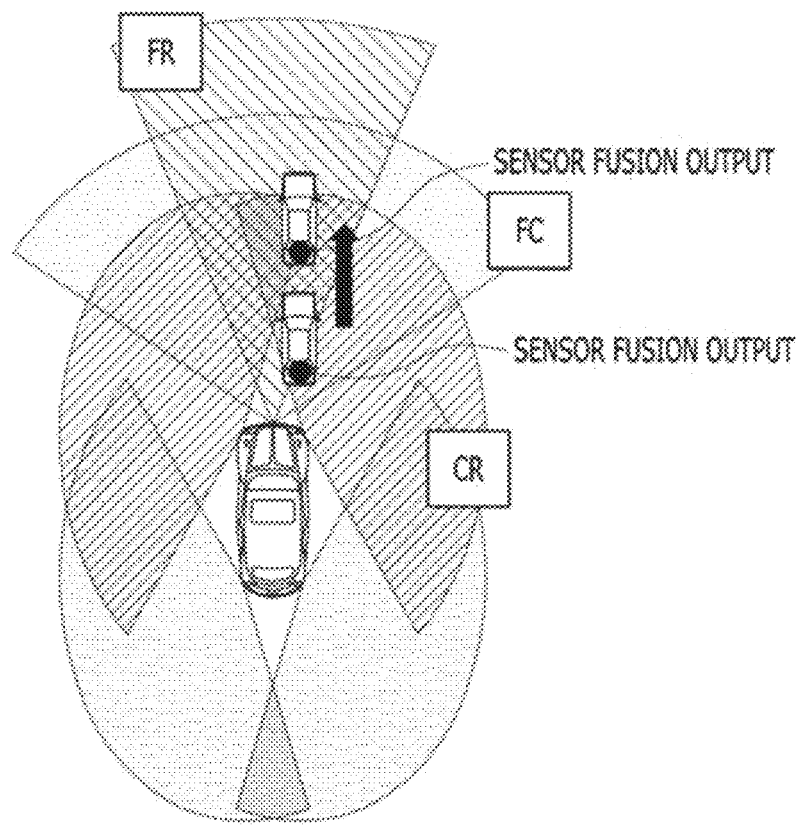

As shown in FIG. 6, if the association is such that the sensor track moves from a first overlapping point between the sensing region of the lateral radar CR and the sensing region of the forward radar FR to a second overlapping point among the sensing region of the lateral radar CR, the sensing region of the forward radar FR and the sensing region of the forward camera FC, the omnidirectional sensor fusion method according to the fifth embodiment may change the sensor track information.

Here, the system may assign a weighted value to the lateral position information of the forward camera track, and may change the sensor track information by fusing the longitudinal position information of the forward camera track, to which the weighted value is assigned, the longitudinal position information of the forward radar track and the longitudinal position information of the lateral radar track.

For example, in the fifth embodiment, if CR+FR→CR+FR+FC, an object, which was not recognized by FC, becomes recognized by FC.

Thus, the lateral position may not be accurate before being recognized by the forward camera. However, when an object is normally recognized by the forward camera, the system may perform sensor fusion by assigning a weighted value to the lateral direction information of the forward camera, thereby improving accuracy.

Figure 7:
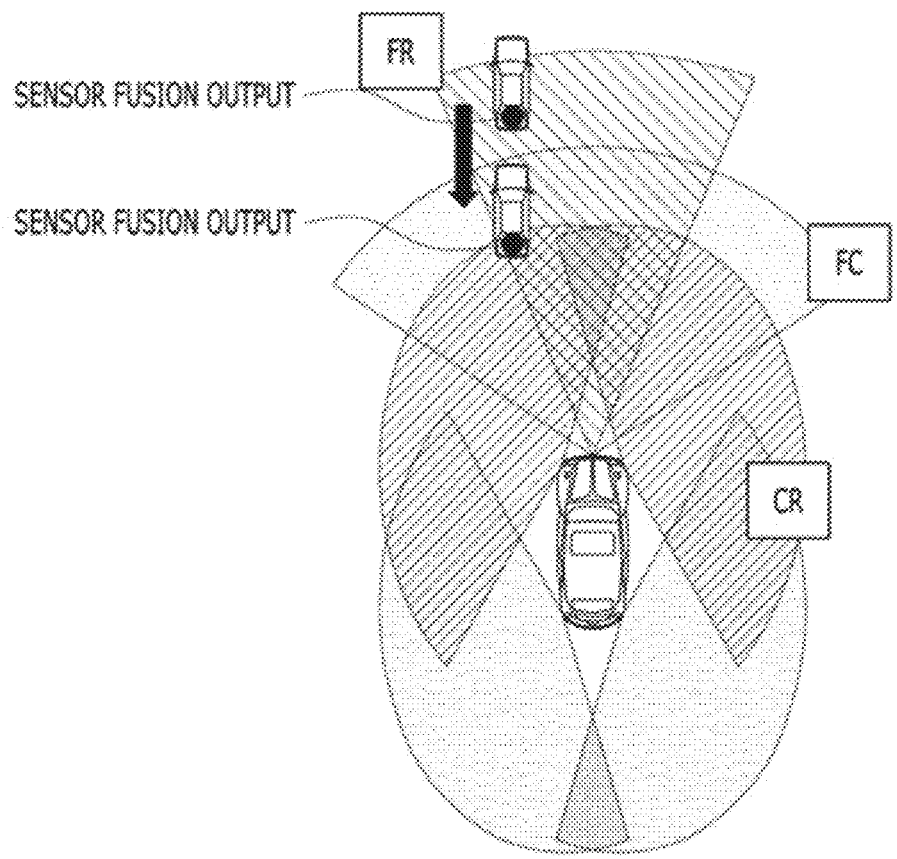

As shown in FIG. 7, if the association is such that the sensor track moves from the sensing region of the forward radar FR to an overlapping point between the sensing region of the forward radar FR and the sensing region of the forward camera FC, the omnidirectional sensor fusion method according to the sixth embodiment may change the sensor track information.

Here, the system may assign a weighted value to each of the lateral position information of the forward camera track and the longitudinal position information of the forward radar track, and may change the sensor track information by fusing the lateral position information of the forward camera track and the longitudinal position information of the forward radar track, to each of which the weighted value is assigned.

For example, in the sixth embodiment, if FR 4 FR+FC, the lateral position may not be accurate at a boundary region.

Therefore, since the accuracy of the lateral position information of the forward camera is high, the system may perform sensor fusion by assigning a weighted value to the lateral position information of the forward camera and assigning a weighted value to the longitudinal position information of the forward radar.

Figure 8:
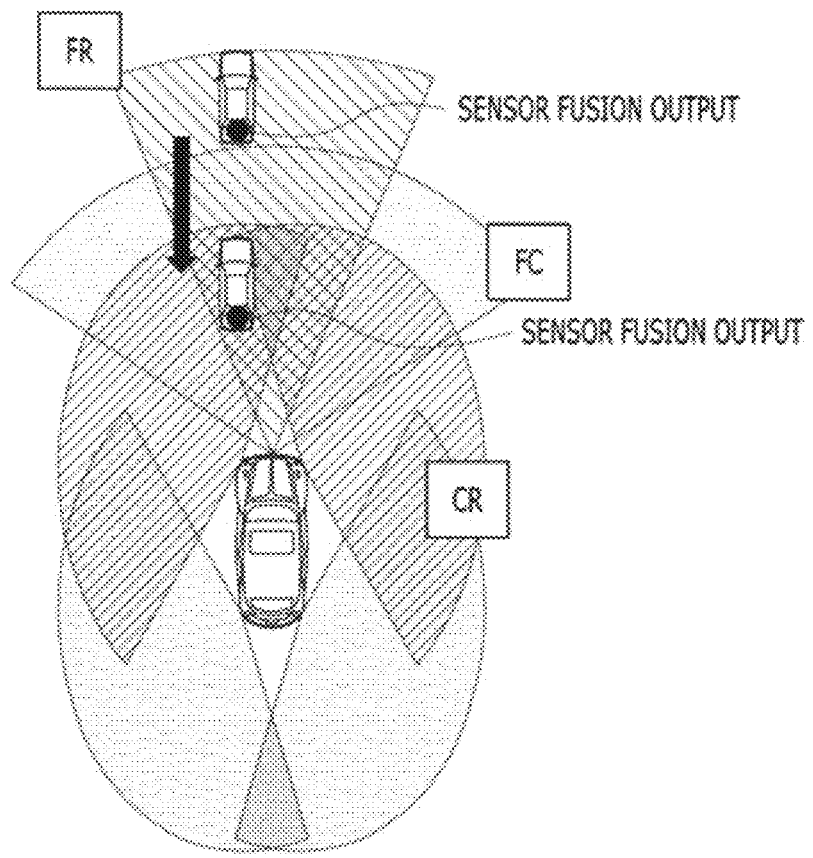

As shown in FIG. 8, if the association is such that the sensor track moves from the sensing region of the forward radar FR to an overlapping point between the sensing region of the forward radar FR and the sensing region of the lateral radar CR, the omnidirectional sensor fusion method according to the seventh embodiment may change the sensor track information.

Here, the system may assign a weighted value to the longitudinal position information of the forward radar track, and may change the sensor track information by fusing the longitudinal position information of the forward radar track, to which the weighted value is assigned, and the longitudinal position information of the lateral radar track.

For example, in the seventh embodiment, if FR→FR+CR, an object may not be recognized by FC.

Therefore, according to embodiments of the present disclosure, if the difference in longitudinal direction position, speed and performance between the lateral radar and the forward radar is not large, it is expected that there is no large change in the estimation performance.

However, the FR longitudinal direction position is more reliable than the CR longitudinal direction position, and is therefore utilized for sensor fusion by assigning a weighted value to the longitudinal direction information of the forward radar.

Figure 9:
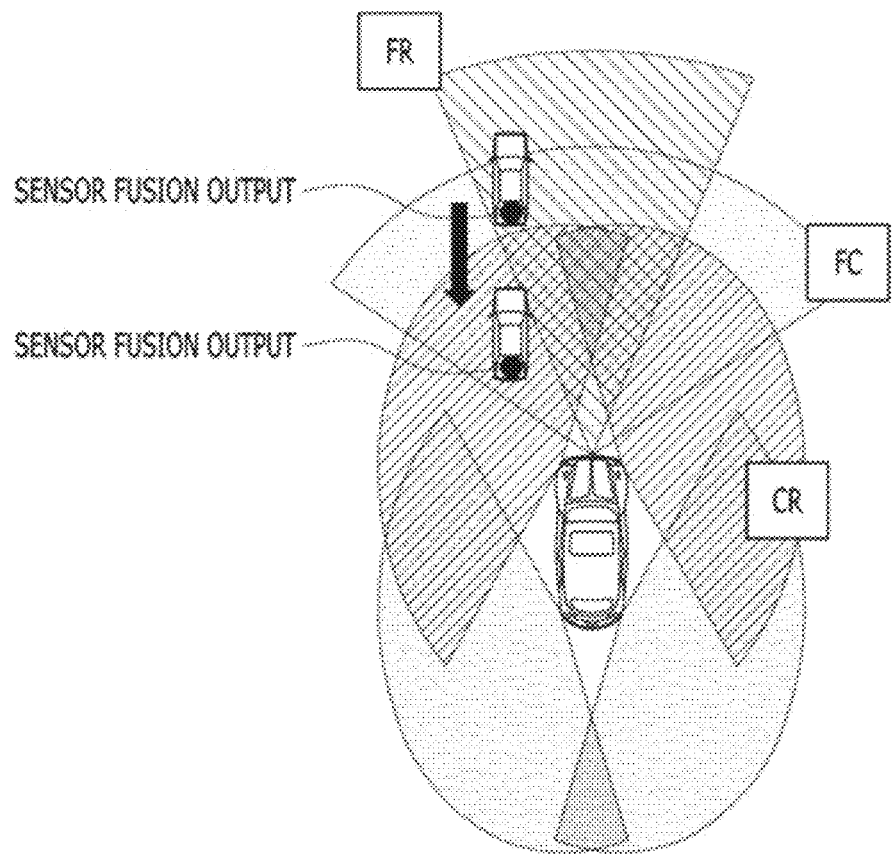

As shown in FIG. 9, if the association is such that the sensor track moves from a first overlapping point between the sensing region of the forward radar FR and the sensing region of the forward camera FC to a second overlapping point among the sensing region of the forward radar FR, the sensing region of the forward camera FC and the sensing region of the lateral radar CR, the omnidirectional sensor fusion method according to the eighth embodiment may change the sensor track information.

Here, the system may assign a weighted value to the longitudinal position information of the forward radar track, and may change the sensor track information by fusing the longitudinal position information of the forward radar track, to which the weighted value is assigned, the longitudinal position information of the forward camera track and the longitudinal position information of the lateral radar track.

For example, in the eighth embodiment, if FR+FC→FR+FC+CR, the difference in longitudinal direction position, speed and performance between the lateral radar and the forward radar may not be large. In this case, it is expected that there is no large change in the estimation performance.

However, the FR longitudinal direction position is more reliable than the CR longitudinal direction position, and is therefore utilized for sensor fusion by assigning a weighted value to the longitudinal direction information of the forward radar.

The CR information is used to update the association map, but the data information thereof is not utilized. The sensor fusion is performed based on the data information of the forward radar and the forward camera.

Figure 10:
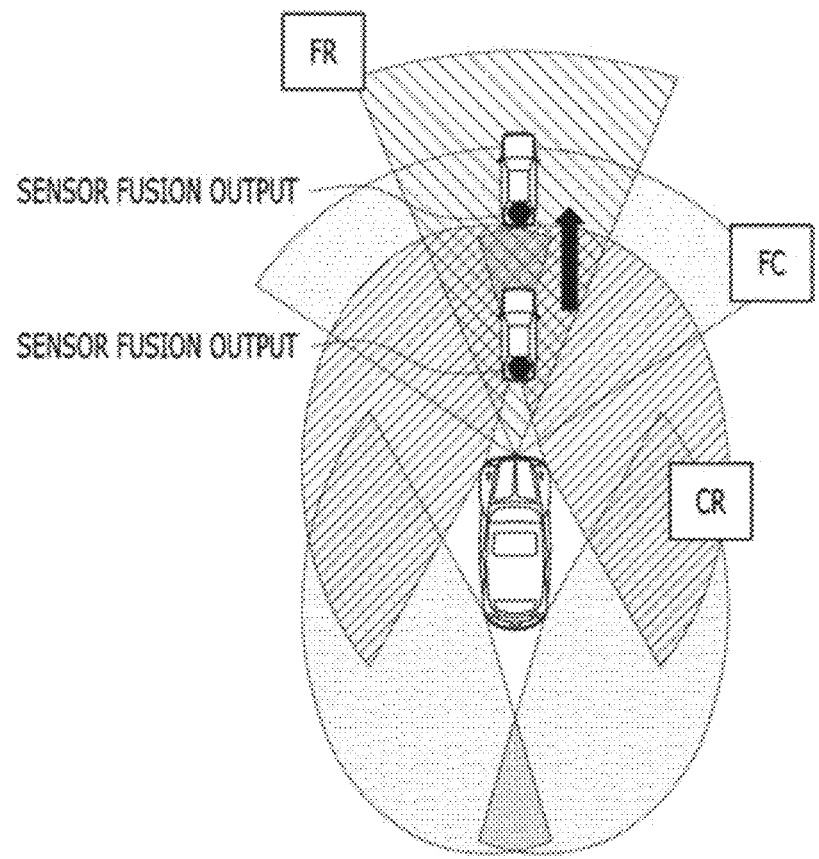

As shown in FIG. 10, if the association is such that the sensor track moves from a first overlapping point between the sensing region of the forward radar FR and the sensing region of the lateral radar CR to a second overlapping point among the sensing region of the forward radar FR, the sensing region of the lateral radar CR and the sensing region of the forward camera FC, the omnidirectional sensor fusion method according to the ninth embodiment may change the sensor track information.

Here, the system may assign a weighted value to each of the lateral position information of the forward camera track and the longitudinal position information of the forward radar track, and may change the sensor track information by fusing the lateral position information of the forward camera track and the longitudinal position information of the forward radar track, to each of which the weighted value is assigned.

For example, in the ninth embodiment, if FR+CR→FR+CR+FC, an object, which was not recognized by FC, becomes recognized by FC.

Therefore, since the accuracy of the lateral position information of the forward camera is higher than that of the lateral radar, the system may perform sensor fusion by assigning a weighted value to the lateral position information of the forward camera and assigning a weighted value to the longitudinal position information of the forward radar.

Further, when FC is additionally associated, the CR information is used to update the association map, but the data information thereof is not utilized. The sensor fusion is performed based on the data information of the forward radar and the forward camera.

Figure 11:
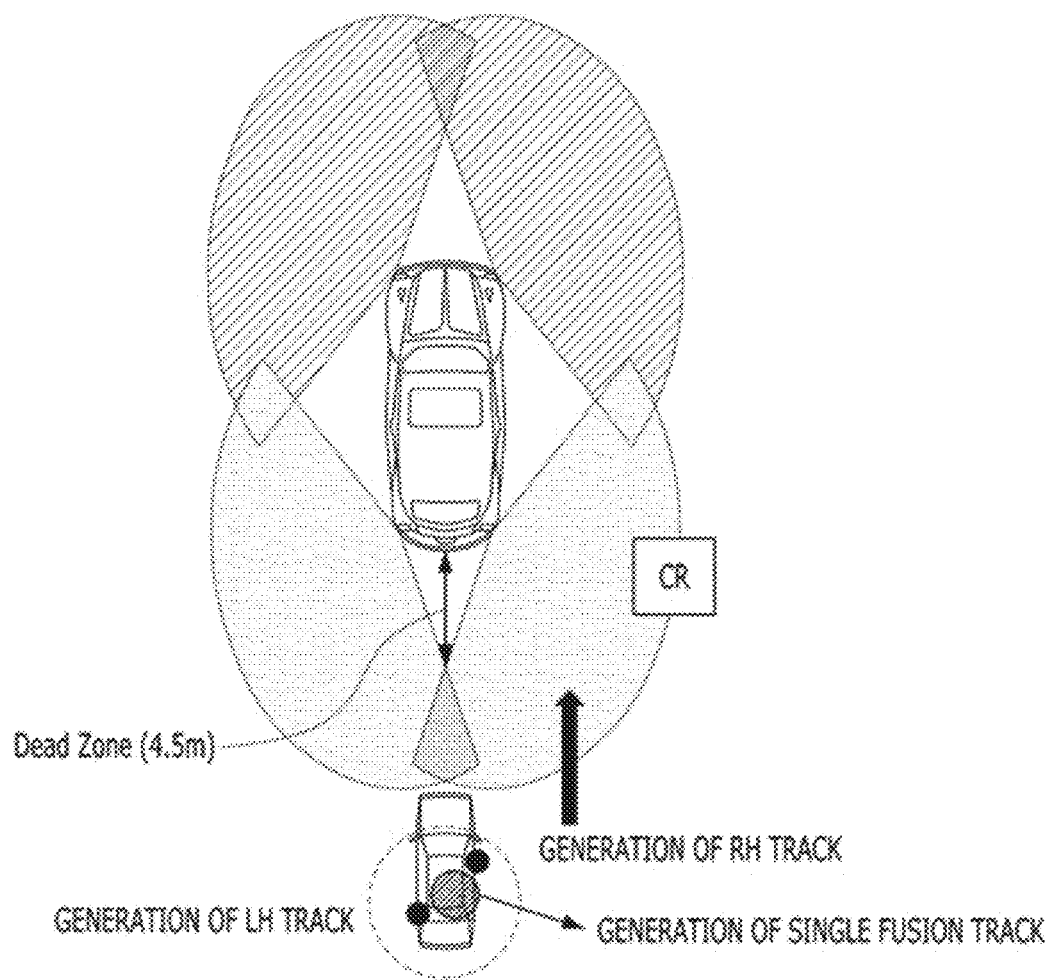

As shown in FIG. 11, if the association is such that the sensor track is located at an overlapping point between the first lateral radar sensing region and the second lateral radar sensing region in the rear region, the omnidirectional sensor fusion method according to the tenth embodiment may change the sensor track information.

Here, the system may change the sensor track information by selecting any one of the first lateral radar track information and the second lateral radar track information.

Depending on the embodiment, when changing the sensor track information, the system may change the sensor track information by fusing the first lateral radar track information and the second lateral radar track information in a ratio of 1:1.

Alternatively, when changing the sensor track information, the system may change the sensor track information by selecting one of the first lateral radar track information and the second lateral radar track information, which is adjacent to the lateral radar.

For example, in the tenth embodiment, if LH CR+RH CR, the following methods are required for lateral radar track fusion in the rear region.

The methods required for lateral radar track fusion may include a method of selecting one of the left and right tracks, a method of performing a summing operation in a ratio of 1:1, and a method of individually using a sensor track in a corresponding region when biased to the left or right. Although one or more operations, techniques, and processes have been described as being performed by a system in some embodiments herein, one or more of such operations, techniques, and processes can also be performed in other forms such as methods, computer-readable storage, devices, and the like. Further, one or more of such operations, techniques, and processes described herein as being performed by the system may be omitted in some embodiments, and any different kinds of such operations, techniques, and processes may be performed by a given system.

Figure 12:
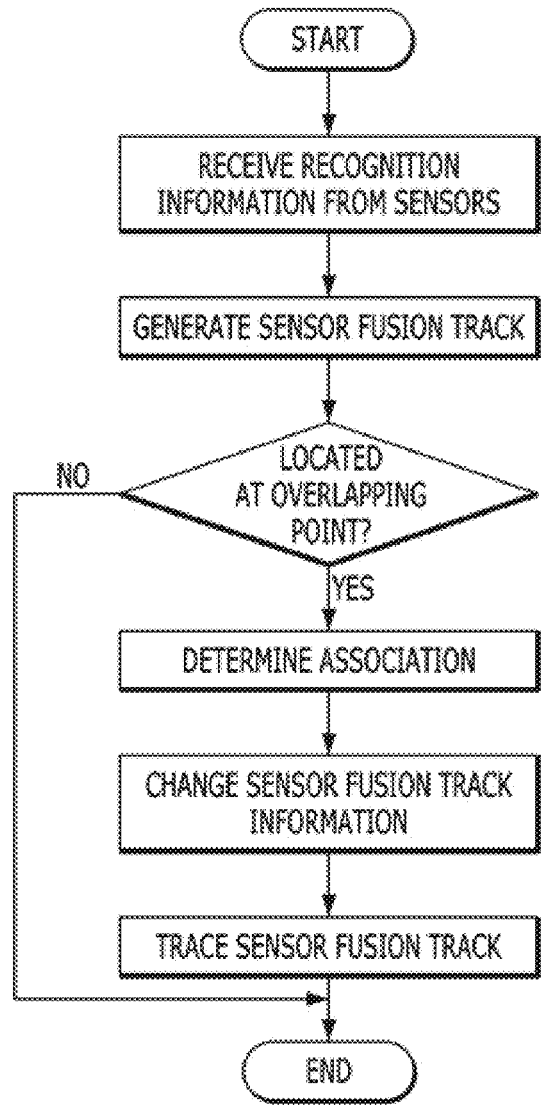
FIG. 12 is a flowchart showing an omnidirectional sensor fusion method according to an embodiment of the present disclosure.

FIG. 12 is a flowchart showing an omnidirectional sensor fusion method according to an embodiment of the present disclosure.

As shown in FIG. 12, a system according to embodiments of the present disclosure may receive multiple pieces of information recognized by one or more sensors.

Here, the system may receive information recognized by a forward radar, a lateral radar and a forward camera.

The system may generate a sensor track based on multiple pieces of information recognized by the one or more sensors.

Subsequently, the system may determine or confirm whether the generated sensor track is located at an overlapping point of the sensing regions of the one or more sensors.

Subsequently, based on the sensor track being located at an overlapping point of the sensing regions of the one or more sensors, the system may determine the association between the sensor fusion track at a previous time point and the sensor track at a current time point.

Subsequently, the system may change sensor track information in response to the determined association and may output a sensor fusion track.

According to a first embodiment, if the association is such that the sensor track moves from the sensing region of the lateral radar to an overlapping point between the sensing region of the lateral radar and the sensing region of the forward radar, the step of changing the sensor track information and outputting the sensor fusion track may include offsetting the lateral position information of the forward radar track based on the width information of the lateral radar track, and fusing the offset lateral position information of the forward radar track and the longitudinal position information of the lateral radar track.

Here, the offset lateral position information of the forward radar track may be the same as the lateral position information of the lateral radar track.

According to the first embodiment, the system may determine or confirm whether the change rate of the sensor track information is equal to or less than a reference value. If the change rate of the sensor track information is equal to or less than a reference value, the sensor track information may be changed and the sensor fusion track may be output.

Here, the change rate of the sensor track information may include at least one of a position change rate, a speed change rate or an acceleration change rate of the sensor track information.

According to a second embodiment, if the association is such that the sensor track moves from the first lateral radar sensing region to the second lateral radar sensing region in the lateral direction, the step of changing the sensor track information and outputting the sensor fusion track may include generating sensor track information located at a dead-zone point between the first lateral radar sensing region and the second lateral radar sensing region.

Here, the step of generating the sensor track information may be performed based on pre-stored memory track information.

According to a third embodiment, if the association is such that the sensor track moves from the first lateral radar sensing region to the second lateral radar sensing region in the lateral direction, the step of changing the sensor track information and outputting the sensor fusion track may include changing sensor track information located at an overlapping point between the first lateral radar sensing region and the second lateral radar sensing region based on first lateral radar track information.

According to a fourth embodiment, if the association is such that the sensor track moves from the sensing region of the lateral radar to an overlapping point between the sensing region of the lateral radar and the sensing region of the forward camera, the step of changing the sensor track information and outputting the sensor fusion track may include assigning a weighted value to each of the lateral position information of the forward camera track and the longitudinal position information of the lateral radar track, and fusing the lateral position information of the forward camera track and the longitudinal position information of the lateral radar track, to each of which the weighted value is assigned.

Here, the step of changing the sensor track information may include calculating a difference value between the lateral position information of the forward radar track and the lateral position information of the lateral camera track, and determining or confirming whether the calculated difference value is equal to or less than a reference value. If the calculated difference value is equal to or less than a reference value, the step of changing the sensor track information may further include assigning a weighted value to each of the lateral position information of the forward camera track and the longitudinal position information of the lateral radar track.

At this time, the step of determining or confirming whether the calculated difference value is equal to or less than a reference value may be performed using the following equation: $d < a\ (Vx \times 0.05)$ (where d represents a difference value, a represents a tuning parameter, Vx represents a lateral speed of the lateral radar track, and 0.05 represents 0.05 s, which is equal to 50 ms).

According to a fifth embodiment, if the association is such that the sensor track moves from a first overlapping point between the sensing region of the lateral radar and the sensing region of the forward camera to a second overlapping point among the sensing region of the lateral radar, the sensing region of the forward camera and the sensing region of the forward radar, the step of changing the sensor track information and outputting the sensor fusion track may include assigning a weighted value to the longitudinal position information of the forward radar track, and fusing the longitudinal position information of the forward radar track, to which the weighted value is assigned, the longitudinal position information of the forward camera track and the longitudinal position information of the lateral radar track.

According to a sixth embodiment, if the association is such that the sensor track moves from a first overlapping point between the sensing region of the lateral radar and the sensing region of the forward radar to a second overlapping point among the sensing region of the lateral radar, the sensing region of the forward radar and the sensing region of the forward camera, the step of changing the sensor track information and outputting the sensor fusion track may include assigning a weighted value to the lateral position information of the forward camera track, and fusing the longitudinal position information of the forward camera track, to which the weighted value is assigned, the longitudinal position information of the forward radar track and the longitudinal position information of the lateral radar track.

According to a seventh embodiment, if the association is such that the sensor track moves from the sensing region of the forward radar to an overlapping point between the sensing region of the forward radar and the sensing region of the forward camera, the step of changing the sensor track information and outputting the sensor fusion track may include assigning a weighted value to each of the lateral position information of the forward camera track and the longitudinal position information of the forward radar track, and fusing the lateral position information of the forward camera track and the longitudinal position information of the forward radar track, to each of which the weighted value is assigned.

According to an eighth embodiment, if the association is such that the sensor track moves from the sensing region of the forward radar to an overlapping point between the sensing region of the forward radar and the sensing region of the lateral radar, the step of changing the sensor track information and outputting the sensor fusion track may include assigning a weighted value to the longitudinal position information of the forward radar track, and fusing the longitudinal position information of the forward radar track, to which the weighted value is assigned, and the longitudinal position information of the lateral radar track.

According to a ninth embodiment, if the association is such that the sensor track moves from a first overlapping point between the sensing region of the forward radar and the sensing region of the forward camera to a second overlapping point among the sensing region of the forward radar, the sensing region of the forward camera and the sensing region of the lateral radar, the step of changing the sensor track information and outputting the sensor fusion track may include assigning a weighted value to the longitudinal position information of the forward radar track, and fusing the longitudinal position information of the forward radar track, to which the weighted value is assigned, the longitudinal position information of the forward camera track and the longitudinal position information of the lateral radar track.

According to a tenth embodiment, if the association is such that the sensor track moves from a first overlapping point between the sensing region of the forward radar and the sensing region of the lateral radar to a second overlapping point among the sensing region of the forward radar, the sensing region of the lateral radar and the sensing region of the forward camera, the step of changing the sensor track information and outputting the sensor fusion track may include assigning a weighted value to each of the lateral position information of the forward camera track and the longitudinal position information of the forward radar track, and fusing the lateral position information of the forward camera track and the longitudinal position information of the forward radar track, to each of which the weighted value is assigned.

Here, if the association is such that the sensor track is located at an overlapping point between the first lateral radar sensing region and the second lateral radar sensing region in the rear region, the step of changing the sensor track information and outputting the sensor fusion track may include any one of a first process of selecting any one of the first lateral radar track information and the second lateral radar track information, a second process of fusing the first lateral radar track information and the second lateral radar track information in a ratio of 1:1, and a third process of selecting one of the first lateral radar track information and the second lateral radar track information, which is adjacent to the lateral radar.

In the final step, the system may trace and maintain the output sensor fusion track.

As is apparent from the above description, according to the omnidirectional sensor fusion system and method and the vehicle including the same related to at least one embodiment of the present disclosure constructed as described above, a sensor fusion track is generated based on the association of a sensor track located at an overlapping point of the sensing regions of the sensors, thereby increasing reliability of the omnidirectional sensor fusion with respect to the boundary region and realizing a robust sensor fusion logic.

For example, the system may be capable of increasing recognition reliability and improving the robustness of the sensor fusion by strategically using the fusion method in the sensing region in which fields of view (FOVs) overlap in the process of performing the omnidirectional sensor fusion.

Further, the system may have an algorithm so as to avoid sudden variations in position, speed and acceleration information of a vehicle recognized in a recognition boundary region (a sensor overlapping region or an independent sensor region) due to the installation of sensors.

Still further, the system may generate a single sensor fusion track with respect to a single target object, and may perform omnidirectional sensor fusion so that a single ID is generated.

In addition, there is provided a computer-readable recording medium, in which a program for implementing the sensor fusion method of the omnidirectional sensor fusion system according to the present disclosure is recorded, and the computer-readable recording medium may perform the process provided by the sensor fusion method according to present disclosure.

A vehicle according to an embodiment of the present disclosure may include a sensing device for sensing a nearby vehicle and an omnidirectional sensor fusion system for outputting a sensor fusion track based on multiple pieces of recognition information received from the sensing device. The omnidirectional sensor fusion system may include a sensor track processing unit configured to receive multiple pieces of recognition information to generate a sensor track, a sensor track association determination unit configured to determine, when the generated sensor track is located at an overlapping point of sensing regions of sensors, association between a sensor fusion track at a previous time point and the sensor track at a current time point, the sensor track association determination unit changing sensor track information in response to the determined association and outputting a sensor fusion track, a sensor fusion track tracing unit configured to trace the output sensor fusion track, and a sensor fusion track maintenance unit configured to maintain the traced sensor fusion track.

One or more embodiments of the present disclosure described above may be implemented as a computer-readable code of a computer-readable medium in which programs are recorded. The computer-readable medium includes all kinds of recording devices in which data that may be read by a computer system is stored. Examples of the computer-readable medium may include a hard disk drive (HDD), a solid state disk (SSD), a silicon disk drive (SDD), ROM, RAM, a CD-ROM, a magnetic tape, a floppy disk, and an optical data storage device. In addition, the computer-readable recording medium includes a carrier wave (e.g. data transmission over the Internet).

It will be appreciated by those skilled in the art that the effects achievable through the present disclosure are not limited to those that have been specifically described hereinabove, and other effects of the present disclosure will be more clearly understood from the detailed description above.

Accordingly, the detailed description above is not intended to be construed to limit the present disclosure in all aspects, but is to be considered by way of example. The scope of the present disclosure should be determined by reasonable interpretation of the accompanying claims, and all equivalent modifications made without departing from the present disclosure should be included in the following claims.

What is claimed is:

1. An omnidirectional sensor fusion system comprising:
a sensor track processing unit configured to receive multiple pieces of recognition information from a plurality of sensors to generate a sensor track of an object;
a sensor track association determination unit configured to determine, based on the generated sensor track of the object located in an overlapping region of sensing regions of the plurality of sensors, a moving association, reflecting a movement of the object with respect to the overlapping region, between a previous sensor fusion track at a previous time point and the generated sensor track at a current time point, the sensor track association determination unit further configured to change sensor track information in response to the determined moving association and output a sensor fusion track;
a sensor fusion track tracing unit including a processor configured to trace the output sensor fusion track; and
a sensor fusion track maintenance unit including a processor configured to maintain the traced sensor fusion track.

2. The omnidirectional sensor fusion system according to claim 1, wherein the sensor track processing unit is further configured to receive the recognition information from a forward radar, a lateral radar, and a forward camera.

3. The omnidirectional sensor fusion system according to claim 1, wherein the sensor track association determination unit is further configured to, based on the moving association being such that the object having the sensor track moves from a sensing region of a lateral radar to an overlapping region between the sensing region of the lateral radar and a sensing region of a forward radar, offset lateral position information of a forward radar track based on width information of a lateral radar track, and fuse the offset lateral position information of the forward radar track and longitudinal position information of the lateral radar track to change the sensor track information.

4. The omnidirectional sensor fusion system according to claim 1, wherein the sensor track association determination unit is further configured to, based on the moving association being such that the object having the sensor track moves from a first lateral radar sensing region to a second lateral radar sensing region in a lateral direction, generate sensor track information located at a dead-zone point between the first lateral radar sensing region and the second lateral radar sensing region based on pre-stored memory track information.

5. The omnidirectional sensor fusion system according to claim 1, wherein the sensor track association determination unit is further configured to, based on the moving association being such that the object having the sensor track moves from a first lateral radar sensing region to a second lateral radar sensing region in a lateral direction, change sensor track information located at an overlapping region between the first lateral radar sensing region and the second lateral radar sensing region based on first lateral radar track information.

6. The omnidirectional sensor fusion system according to claim 1, wherein the sensor track association determination unit is further configured to, based on the moving association being such that the object having the sensor track moves from a sensing region of a lateral radar to an overlapping region between the sensing region of the lateral radar and a sensing region of a forward camera, assign a weighted value to each of lateral position information of a forward camera track and longitudinal position information of a lateral radar track, and fuse the lateral position information of the forward camera track and the longitudinal position information of the lateral radar track, to each of which the weighted value is assigned, to change the sensor track information.

7. The omnidirectional sensor fusion system according to claim 1, wherein the sensor track association determination unit is further configured to, based on the moving association being such that the object having the sensor track moves from a first overlapping region between a sensing region of a lateral radar and a sensing region of a forward camera to a second overlapping region among the sensing region of the lateral radar, the sensing region of the forward camera and a sensing region of forward radar, assign a weighted value to longitudinal position information of a forward radar track, and fuse the longitudinal position information of the forward radar track, to which the weighted value is assigned, longitudinal position information of a forward camera track and longitudinal position information of a lateral radar track to change the sensor track information.

8. The omnidirectional sensor fusion system according to claim 1, wherein the sensor track association determination unit is further configured to, based on the moving association being such that the object having the sensor track moves from a first overlapping region between a sensing region of a lateral radar and a sensing region of a forward radar to a second overlapping region among the sensing region of the lateral radar, the sensing region of the forward radar and a sensing region of a forward camera, assign a weighted value to lateral position information of a forward camera track, and fuse the longitudinal position information of the forward camera track, to which the weighted value is assigned, longitudinal position information of a forward radar track and longitudinal position information of a lateral radar track to change the sensor track information.

9. The omnidirectional sensor fusion system according to claim 1, wherein the sensor track association determination unit is further configured to, based on the moving association being such that the object having the sensor track moves from a sensing region of a forward radar to an overlapping region between the sensing region of the forward radar and a sensing region of a forward camera, assign a weighted value to each of lateral position information of a forward camera track and longitudinal position information of a forward radar track, and fuse the lateral position information of the forward camera track and the longitudinal position information of the forward radar track, to each of which the weighted value is assigned, to change the sensor track information.

10. The omnidirectional sensor fusion system according to claim 1, wherein the sensor track association determination unit is further configured to, based on the moving association being such that the object having the sensor track moves from a sensing region of a forward radar to an overlapping region between the sensing region of the forward radar and a sensing region of a lateral radar, assign a weighted value to longitudinal position information of a forward radar track, and fuse the longitudinal position information of the forward radar track, to which the weighted value is assigned, and longitudinal position information of a lateral radar track to change the sensor track information.

11. An omnidirectional sensor fusion method comprising:
receiving multiple pieces of recognition information from a plurality of sensors;
generating a sensor track of an object based on the multiple pieces of recognition information;
determining whether the object having the generated sensor track is located at an overlapping region of sensing regions of the plurality of sensors;
upon determining that the object having the generated sensor track is located at the overlapping region of the sensing regions of the one or more plurality of sensors, determining a moving association, reflecting a movement of the object with respect to the overlapping region, between a previous sensor fusion track at a previous time point and the generated sensor track at a current time point;
changing sensor track information in response to the determined moving association to output a sensor fusion track; and
tracing and maintaining the output sensor fusion track.

12. The omnidirectional sensor fusion method according to claim 11, wherein the receiving of the multiple pieces of recognition information comprises receiving the recognition information from a forward radar, a lateral radar, and a forward camera.

13. The omnidirectional sensor fusion method according to claim 11, wherein the moving association is such that the object having the sensor track moves from a sensing region of a lateral radar to an overlapping region between the sensing region of the lateral radar and a sensing region of a forward radar, and
the changing of the sensor track information to output a sensor fusion track comprises offsetting lateral position information of a forward radar track based on width information of a lateral radar track, and fusing the offset lateral position information of the forward radar track and longitudinal position information of the lateral radar track to change the sensor track information.

14. The omnidirectional sensor fusion method according to claim 11, wherein the moving association is such that the object having the sensor track moves from a first lateral radar sensing region to a second lateral radar sensing region in a lateral direction, and the changing of the sensor track information to output a sensor fusion track comprises generating sensor track information located at a dead-zone point between the first lateral radar sensing region and the second lateral radar sensing region based on pre-stored memory track information.

15. The omnidirectional sensor fusion method according to claim 11, wherein the moving association is such that the object having the sensor track moves from a first lateral radar sensing region to a second lateral radar sensing region in a lateral direction, and
the changing of the sensor track information to output a sensor fusion track comprises changing sensor track information located at an overlapping region between the first lateral radar sensing region and the second lateral radar sensing region based on first lateral radar track information.

16. The omnidirectional sensor fusion method according to claim 11, wherein the moving association is such that the object having the sensor track moves from a sensing region of a lateral radar to an overlapping region between the sensing region of the lateral radar and a sensing region of a forward camera, and
the changing of the sensor track information to output a sensor fusion track comprises assigning a weighted value to each of lateral position information of a forward camera track and longitudinal position information of a lateral radar track, and fusing the lateral position information of the forward camera track and the longitudinal position information of the lateral radar track, to each of which the weighted value is assigned, to change the sensor track information.

17. The omnidirectional sensor fusion method according to claim 11, wherein the moving association is such that the object having the sensor track moves from a first overlapping region between a sensing region of a lateral radar and a sensing region of a forward camera to a second overlapping region among the sensing region of the lateral radar, the sensing region of the forward camera and a sensing region of forward radar, and
the changing of the sensor track information to output a sensor fusion track comprises assigning a weighted value to longitudinal position information of a forward radar track, and fusing the longitudinal position information of the forward radar track, to which the weighted value is assigned, longitudinal position information of a forward camera track and longitudinal position information of a lateral radar track to change the sensor track information.

18. The omnidirectional sensor fusion method according to claim 11, wherein the moving association is such that the object having the sensor track moves from a first overlapping region between a sensing region of a lateral radar and a sensing region of a forward radar to a second overlapping region among the sensing region of the lateral radar, the sensing region of the forward radar and a sensing region of a forward camera, and
the changing of the sensor track information to output a sensor fusion track comprises assigning a weighted value to lateral position information of a forward camera track, and fusing the longitudinal position information of the forward camera track, to which the weighted value is assigned, longitudinal position information of a forward radar track and longitudinal position information of a lateral radar track to change the sensor track information.

19. The omnidirectional sensor fusion method according to claim 11, wherein the moving association is such that the object having the sensor track moves from a sensing region of a forward radar to an overlapping region between the sensing region of the forward radar and a sensing region of a forward camera, and the changing of the sensor track information to output a sensor fusion track comprises assigning a weighted value to each of lateral position information of a forward camera track and longitudinal position information of a forward radar track, and fusing the lateral position information of the forward camera track and the longitudinal position information of the forward radar track, to each of which the weighted value is assigned, to change the sensor track information.

20. The omnidirectional sensor fusion method according to claim 11, wherein the moving association is such that the object having the sensor track moves from a sensing region of a forward radar to an overlapping region between the sensing region of the forward radar and a sensing region of a lateral radar, and the changing of the sensor track information to output a sensor fusion track comprises assigning a weighted value to longitudinal position information of a forward radar track, and fusing the longitudinal position information of the forward radar track, to which the weighted value is assigned, and longitudinal position information of a lateral radar track to change the sensor track information.

* * * * *